United States Patent
Merna et al.

(10) Patent No.: US 8,970,870 B2
(45) Date of Patent: Mar. 3, 2015

(54) DELIVERY OF SCAN SERVICES OVER A DEVICE SERVICE PORT

(75) Inventors: Thao Phuong Merna, Huntington Beach, CA (US); Kevin Robert Lloyd, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 12/828,058

(22) Filed: Jun. 30, 2010

(65) Prior Publication Data

US 2012/0002243 A1 Jan. 5, 2012

(51) Int. Cl.
G06F 3/12 (2006.01)
H04N 1/00 (2006.01)

(52) U.S. Cl.
CPC ........ *H04N 1/00225* (2013.01); *H04N 1/00217* (2013.01)
USPC ............. 358/1.15; 358/1.14; 399/8; 707/803; 707/802; 707/809; 707/790

(58) Field of Classification Search
None
See application file for complete search history.

(56) References Cited

U.S. PATENT DOCUMENTS

| | | | |
|---|---|---|---|
| 6,859,920 B1 * | 2/2005 | Finocchio ..................... | 717/108 |
| 6,968,539 B1 * | 11/2005 | Huang et al. ................... | 717/115 |
| 7,171,648 B1 * | 1/2007 | Finocchio ..................... | 717/110 |
| 7,251,777 B1 * | 7/2007 | Valtchev et al. ............... | 715/234 |
| 7,843,586 B2 * | 11/2010 | Ferlitsch ........................ | 358/1.15 |
| 7,973,957 B2 * | 7/2011 | Dodge et al. ................... | 358/1.15 |
| 8,199,131 B2 * | 6/2012 | Dodge et al. ................... | 345/179 |
| 8,213,027 B2 * | 7/2012 | Dodge et al. ................... | 358/1.1 |
| 8,310,706 B2 * | 11/2012 | Xiao et al. ..................... | 358/1.15 |
| 8,325,366 B2 * | 12/2012 | Yamaguchi ................... | 358/1.15 |
| 8,572,065 B2 * | 10/2013 | McDonald et al. ........... | 707/708 |
| 2002/0103720 A1 * | 8/2002 | Cline et al. ..................... | 705/27 |
| 2003/0227640 A1 * | 12/2003 | Liang et al. ................... | 358/1.13 |
| 2004/0179103 A1 * | 9/2004 | Endo et al. .................. | 348/207.2 |
| 2005/0039124 A1 * | 2/2005 | Chu et al. ...................... | 715/531 |
| 2005/0046887 A1 * | 3/2005 | Shibata et al. ................ | 358/1.13 |
| 2005/0100352 A1 * | 5/2005 | Imai ................................. | 399/8 |
| 2005/0234929 A1 * | 10/2005 | Ionescu et al. ................ | 707/100 |
| 2005/0275876 A1 * | 12/2005 | McLean et al. .............. | 358/1.15 |
| 2006/0031833 A1 * | 2/2006 | Huang et al. ................... | 717/178 |

(Continued)

OTHER PUBLICATIONS

"Scan Service Definition Version 1.0 for Web Services on Devices", Nov. 9, 2006, Microsoft Corporation.

(Continued)

*Primary Examiner* — King Poon
*Assistant Examiner* — Ted Barnes
(74) *Attorney, Agent, or Firm* — Fitzpatrick, Cella, Harper & Scinto

(57) ABSTRACT

Delivery of scan services of a networked scanning device over a device service port interfaced to the network. An extended XML schema is comprised of an extension to a baseline XML schema which defines baseline functions exposed by the scanning device via the device service port together with baseline parameters for such functions. The extension defines an additional parameter for a predesignated one of the plural baseline functions. A scan job is created by transmission of a request to create a scan job over the device service port. A request for scanner functionality defined by the predesignated function is transmitted to the scanning device via the device service port, with a non-null value specifying a device command for the additional parameter. Data responsive to execution of the device command by the scanning device is transmitted to the client via the device service port.

24 Claims, 15 Drawing Sheets

(56) References Cited

U.S. PATENT DOCUMENTS

| | | | |
|---|---|---|---|
| 2007/0043631 A1* | 2/2007 | Cline et al. | 705/26 |
| 2007/0121125 A1* | 5/2007 | Dodge et al. | 358/1.1 |
| 2007/0203721 A1* | 8/2007 | Skunberg et al. | 705/1 |
| 2008/0114740 A1* | 5/2008 | Vergottini | 707/3 |
| 2008/0301666 A1* | 12/2008 | Gordon et al. | 717/172 |
| 2009/0031313 A1* | 1/2009 | Tian | 718/102 |
| 2009/0077278 A1* | 3/2009 | Kuroda | 710/58 |
| 2009/0125469 A1* | 5/2009 | McDonald et al. | 706/47 |
| 2009/0168091 A1* | 7/2009 | Fu et al. | 358/1.15 |
| 2009/0240697 A1* | 9/2009 | Fenelon | 707/10 |
| 2009/0288104 A1* | 11/2009 | Bagepalli et al. | 719/328 |
| 2010/0027050 A1* | 2/2010 | Regnier | 358/1.15 |
| 2010/0123920 A1* | 5/2010 | Kusakabe | 358/1.14 |
| 2010/0157384 A1* | 6/2010 | Wu et al. | 358/474 |
| 2010/0225958 A1* | 9/2010 | Selvaraj et al. | 358/1.15 |
| 2010/0225959 A1* | 9/2010 | Selvaraj et al. | 358/1.15 |
| 2010/0231964 A1* | 9/2010 | Watanabe | 358/1.15 |
| 2010/0250649 A1* | 9/2010 | Larsson et al. | 709/203 |
| 2010/0325530 A1* | 12/2010 | Murai | 715/234 |
| 2010/0332677 A1* | 12/2010 | Tian | 709/233 |
| 2011/0026072 A1* | 2/2011 | Xiao et al. | 358/1.15 |
| 2011/0058219 A1* | 3/2011 | Fukasawa | 358/1.15 |
| 2011/0179088 A1* | 7/2011 | Medi et al. | 707/803 |
| 2011/0188063 A1* | 8/2011 | Nuggehalli et al. | 358/1.13 |

OTHER PUBLICATIONS

"WS-Scan scheme", Microsoft Corporation, 2006.

Zeeb, et al., "Lessons learned from implementing the Devices Profile for Web Services", 2007 Inaugural IEEE International Conference on Digital Ecosystems and Techologies.

\* cited by examiner

```
<?xml version="1.0" encoding="utf-8" ?>
<soap:Envelope xmlns:soap="http://www.w3.org/2003/05/soap-envelope"
xmlns:wsa="http://schemas.xmlsoap.org/ws/2004/08/addressing"
xmlns:sca="http://schemas.microsoft.com/windows/2006/08/wdp/scan" xmlns:cijsn="http://www.usa.canon.com">
<soap:Header>
    <wsa:To>http://146.184.16.18:4000/Scanner</wsa:To><wsa:Action>http://schemas.microsoft.com/windows/2006/08/wdp/
scan/CreateScanJob</wsa:Action> <wsa:MessageID>urn:uuid:e38badd2-c880-4e9d-b89c-5616f0a06f2f</wsa:MessageID>
<wsa:ReplyTo><wsa:Address>http://schemas.xmlsoap.org/ws/2004/08/addressing/role/anonymous</wsa:Address></
wsa:ReplyTo><wsa:From><wsa:Address>http://146.184.16.48:5358</wsa:Address></wsa:From>
</soap:Header>
<soap:Body>
        <sca:CreateScanJobRequest>
                <sca:ScanTicket>
                        <sca:JobDescription>
                                <sca:JobName>Scan Job</sca:JobName>
                                <sca:JobOriginatingUserName>John Doe</sca:JobOriginatingUserName>
                                <sca:JobInformation>User Selected Scan Job</sca:JobInformation>
                        </sca:JobDescription>
                        <sca:DocumentParameters>
                                <sca:Format>exif</sca:Format>
                                <sca:CompressionQualityFactor>0</sca:CompressionQualityFactor>
                                <sca:ImagesToTransfer>1</sca:ImagesToTransfer>
                                <sca:InputSource>Platen</sca:InputSource>
                                <sca:ContentType>Auto</sca:ContentType>
                                <sca:InputSize>
                                        <sca:DocumentSizeAutoDetect>1</sca:DocumentSizeAutoDetect>
                                </sca:InputSize>
                                <sca:Exposure>
                                        <sca:AutoExposure>1</sca:AutoExposure>
                                </sca:Exposure>
                                <sca:Scaling>
                                        <sca:ScalingWidth>100</sca:ScalingWidth>
                                        <sca:ScalingHeight>100</sca:ScalingHeight>
                                </sca:Scaling>
                                <sca:Rotation>0</sca:Rotation>
                        </sca:DocumentParameters>
                </sca:ScanTicket>
                <cijsn:IJCommand>
                        <cijsn:Software>
                                <cijsn:Name>MPDriver</cijsn:Name>
                                <cijsn:Version>2.0</cijsn:Version>
                        </cijsn:Software>
                        <cijsn:OSVersion>
                                <cijsn:OSMajor>6</cijsn:OSMajor>
                                <cijsn:OSMinor>1</cijsn:OSMinor>
                                <cijsn:Build>6001</cijsn:Build>
                                <cijsn:SPMajor>1</cijsn:SPMajor>
                                <cijsn:SPMinor>0</cijsn:SPMinor>
                                <cijsn:Arch>9</cijsn:Arch>
                        </cijsn:OSVersion>
                </cijsn:IJCommand>
        </sca:CreateScanJobRequest>
</soap:Body>
</soap:Envelope>
```

FIG. 6

```
<xs:complexType name="CreateScanJobRequestType">
   <xs:sequence>
      <xs:element name="ScanIdentifier" type="wscn:String255ExtType" minOccurs="0"/>
      <xs:element name="DestinationToken" type="wscn:String255ExtType" minOccurs="0"/>
      <xs:element name="ScanTicket" type="wscn:ScanTicketType"/>
      <xs:any namespace="##other" minOccurs="0" maxOccurs="unbunded"/>
   </xs:sequence>
</xs:complexType>
```
⎯701

FIG. 7

```xml
<?xml version="1.0" encoding="utf-8" ?>
<soap:Envelope xmlns:soap="http://www.w3.org/2003/05/soap-envelope"
xmlns:wsa="http://schemas.xmlsoap.org/ws/2004/08/addressing"
xmlns:sca="http://schemas.microsoft.com/windows/2006/08/wdp/scan"
xmlns:cijn="http://www.usa.canon.com">
    <soap:Header>
<wsa:To>http://146.184.16.18:4000/Scanner</wsa:To>
<wsa:Action>http://schemas.microsoft.com/windows/2006/08/wdp/scan/GetScannerElements</wsa:Action>
<wsa:MessageID>urn:uuid:14e3a54b-7072-41b4-9774-c192b783c0eb</wsa:MessageID>
<wsa:ReplyTo>
<wsa:Address>http://schemas.xmlsoap.org/ws/2004/08/addressing/role/anonymous</wsa:Address>
</wsa:ReplyTo>
<wsa:From>
<wsa:Address>http://146.184.16.48:5358</wsa:Address>
</wsa:From>
    </soap:Header>
    <soap:Body>
        <sca:GetScannerElementsRequest>
            <sca:RequestedElements>
                <cijn:IJCommand>
                    <cijn:IJCmdSend>A Text String</cijn:IJCmdSend>
                    <cijn:OSVersion>
                        <cijn:OSMajor>6</cijn:OSMajor>
                        <cijn:OSMinor>1</cijn:OSMinor>
                        <cijn:Build>6001</cijn:Build>
                        <cijn:SPMajor>1</cijn:SPMajor>
                        <cijn:SPMinor>0</cijn:SPMinor>
                        <cijn:Arch>9</cijn:Arch>
                    </cijn:OSVersion>
                </cijn:IJCommand>
            </sca:RequestedElements>
        </sca:GetScannerElementsRequest>
    </soap:Body>
</soap:Envelope>
```

FIG. 8

```
<xs:annotation>
    <xs:documentation>Client Information definition</xs:documentation>
</xs:annotation>
<xs:complexType name="RequestedScannerElementsType">
    <xs:sequence>
        <xs:element name="Name" type="xs:QName" minOccurs="0" maxOccurs="unbounded"/>
        <xs:any namespace="##other" minOccurs="0" maxOccurs="unbounded"/>
    </xs:sequence>
    <xs:anyAttribute namespace="##other" processContents="lax"/>
</xs:complexType>
```
⸺901

FIG. 9

```xml
<?xml version='1.0' ?>
<env:Envelope xmlns:env="http://www.w3.org/2003/05/soap-envelope"
    xmlns:wscn="http://schemas.microsoft.com/windows/2006/08/wdp/scan"
    xmlns:disc="http://schemas.xmlsoap.org/ws/2005/04/discovery"
    xmlns:wsa="http://schemas.xmlsoap.org/ws/2004/08/addressing"
    xmlns:cijsn="http://www.canon.com/ns/wdp/scan"
>
    <env:Header>
  <wsa:Action>http://schemas.microsoft.com/windows/2006/08/wdp/scan/GetScannerElementsResponse</wsa:Action><wsa:MessageID>uuid:ABCD6747-0088-0000-FFFF-28861791A28D</wsa:MessageID><wsa:RelatesTo>urn:uuid:9aeb89da-9b94-414f-9126-979eb709e697</wsa:RelatesTo><wsa:To>http://schemas.xmlsoap.org/ws/2004/08/addressing/role/anonymous</wsa:To>

</env:Header>
    <env:Body>
        <wscn:GetScannerElementsResponse >
            <wscn:ScannerElements >
                <wscn:ElementData Name="cijsn:IJCommand" Valid="true">
                    <cijsn:IJCommand >
                        <cijsn:IJCmdSend>Success</cijsn:IJCmdSend>
                        <cijsn:Sofware >
                            <cijsn:Name>MPDriver</cijsn:Name>
                            <cijsn:Version>2.0</cijsn:Version>
                        </cijsn:Sofware>
                        <cijsn:OSVersion >
                            <cijsn:OSMajor>6</cijsn:OSMajor>
                            <cijsn:OSMinor>1</cijsn:OSMinor>
                            <cijsn:Build>6001</cijsn:Build>
                            <cijsn:SPMajor>1</cijsn:SPMajor>
                            <cijsn:SPMinor>0</cijsn:SPMinor>
                            <cijsn:Arch>9</cijsn:Arch>
                        </cijsn:OSVersion>
                    </cijsn:IJCommand>
                </wscn:ElementData>
            </wscn:ScannerElements>
        </wscn:GetScannerElementsResponse>
    </env:Body>
</env:Envelope>
```

FIG. 10

```xml
<?xml version="1.0" encoding="utf-8" ?>
<soap:Envelope xmlns:soap="http://www.w3.org/2003/05/soap-envelope"
xmlns:wsa="http://schemas.xmlsoap.org/ws/2004/08/addressing"
xmlns:sca="http://schemas.microsoft.com/windows/2006/08/wdp/scan"
xmlns:cijn="http://www.usa.canon.com">
    <soap:Header>
  <wsa:To>http://146.184.16.18:4000/Scanner</wsa:To>
<wsa:Action>http://schemas.microsoft.com/windows/2006/08/wdp/scan/GetScannerElements</wsa:Action>
<wsa:MessageID>urn:uuid:c610cdcd-4322-4f7b-aa89-e911b9d4f68f</wsa:MessageID>
<wsa:ReplyTo>
      <wsa:Address>http://schemas.xmlsoap.org/ws/2004/08/addressing/role/anonymous</wsa:Address>
</wsa:ReplyTo>
<wsa:From>
      <wsa:Address>http://146.184.16.48:5358</wsa:Address>
</wsa:From>
    </soap:Header>
    <soap:Body>
        <sca:GetScannerElementsRequest>
            <sca:RequestedElements>
                <cijn:IJCommand>
                    <cijn:IJCmdRecvShort/>
                    <cijn:IJCmdRecvSize>8</cijn:IJCmdRecvSize>
                    <cijn:OSVersion>
                        <cijn:OSMajor>6</cijn:OSMajor>
                        <cijn:OSMinor>1</cijn:OSMinor>
                        <cijn:Build>6001</cijn:Build>
                        <cijn:SPMajor>1</cijn:SPMajor>
                        <cijn:SPMinor>0</cijn:SPMinor>
                        <cijn:Arch>9</cijn:Arch>
                    </cijn:OSVersion>
                </cijn:IJCommand>
            </sca:RequestedElements>
        </sca:GetScannerElementsRequest>
    </soap:Body>
</soap:Envelope>
```

FIG. 11

```xml
<?xml version='1.0' ?>
<env:Envelope xmlns:env="http://www.w3.org/2003/05/soap-envelope"
    xmlns:wscn="http://schemas.microsoft.com/windows/2006/08/wdp/scan"
    xmlns:disc="http://schemas.xmlsoap.org/ws/2005/04/discovery"
    xmlns:wsa="http://schemas.xmlsoap.org/ws/2004/08/addressing"
    xmlns:cijsn="http://www.canon.com/ns/wdp/scan"
>
    <env:Header>
  <wsa:Action>http://schemas.microsoft.com/windows/2006/08/wdp/scan/GetScannerElementsResponse</wsa:Action>
  <wsa:MessageID>uuid:ABCD6747-0089-0000-FFFF-28861791A28D</wsa:MessageID>
  <wsa:RelatesTo>urn:uuid:c610cdcd-4322-4f7b-aa89-e911b9d4f68f</wsa:RelatesTo>
  <wsa:To>http://schemas.xmlsoap.org/ws/2004/08/addressing/role/anonymous</wsa:To>

</env:Header>
    <env:Body>
        <wscn:GetScannerElementsResponse >
            <wscn:ScannerElements >
                <wscn:ElementData Name="cijsn:IJCommand" Valid="true">
                    <cijsn:IJCommand >
                        <cijsn:IJCmdRecvShort><![CDATA[06060
00000000000]]></cijsn:IJCmdRecvShort>
                        <cijsn:Sofware >
                            <cijsn:Name>MPDriver</cijsn:Name>
                            <cijsn:Version>2.0</cijsn:Version>
                        </cijsn:Sofware>
                        <cijsn:OSVersion >
                            <cijsn:OSMajor>6</cijsn:OSMajor>
                            <cijsn:OSMinor>1</cijsn:OSMinor>
                            <cijsn:Build>6001</cijsn:Build>
                            <cijsn:SPMajor>1</cijsn:SPMajor>
                            <cijsn:SPMinor>0</cijsn:SPMinor>
                            <cijsn:Arch>9</cijsn:Arch>
                        </cijsn:OSVersion>
                    </cijsn:IJCommand>
                </wscn:ElementData>
            </wscn:ScannerElements>
        </wscn:GetScannerElementsResponse>
    </env:Body>
</env:Envelope>
```

FIG. 12

```
<?xml version="1.0" encoding="utf-8" ?>
<soap:Envelope xmlns:soap="http://www.w3.org/2003/05/soap-envelope"
 xmlns:wsa="http://schemas.xmlsoap.org/ws/2004/08/addressing"
 xmlns:sca="http://schemas.microsoft.com/windows/2006/08/wdp/scan"
 xmlns:cijsn="http://www.usa.canon.com">
        <soap:Header>
<wsa:To>http://146.184.16.18:4000/Scanner</wsa:To>
<wsa:Action>http://schemas.microsoft.com/windows/2006/08/wdp/scan/GetScannerElements</wsa:Action>
<wsa:MessageID>urn:uuid:3c1fb357-6521-48b8-8c4b-3e9a08a5b5a2</wsa:MessageID>
 <wsa:ReplyTo>
<wsa:Address>http://schemas.xmlsoap.org/ws/2004/08/addressIng/role/anonymous</wsa:Address>
</wsa:ReplyTo>
<wsa:From>
<wsa:Address>http://146.184.16.48:5358</wsa:Address>
</wsa:From>
        </soap:Header>
        <soap:Body>
                <sca:GetScannerElementsRequest>
                        <sca:RequestedElements>
                                <sca:Name>cijsn:IJCommand</sca:Name>
                                <sca:Name>cijsn:IJCmdPhase-ClosePort</sca:Name>
                        </sca:RequestedElements>
                </sca:GetScannerElementsRequest>
        </soap:Body>
</soap:Envelope>
```

FIG. 13

```xml
<?xml version="1.0" encoding="utf-8" ?>
<soap:Envelope xmlns:soap="http://www.w3.org/2003/05/soap-envelope"
xmlns:wsa="http://schemas.xmlsoap.org/ws/2004/08/addressing"
xmlns:sca="http://schemas.microsoft.com/windows/2006/08/wdp/scan"
xmlns:cijn="http://www.usa.canon.com">
    <soap:Header>
<wsa:To>http://146.184.16.18:4000/Scanner</wsa:To>
<wsa:Action>http://schemas.microsoft.com/windows/2006/08/wdp/scan/GetScannerElements</wsa:Action>
<wsa:MessageID>urn:uuid:c6b8e229-e18e-442d-8ee5-c482e2a16796</wsa:MessageID>
<wsa:ReplyTo>
<wsa:Address>http://schemas.xmlsoap.org/ws/2004/08/addressing/role/anonymous</wsa:Address>
</wsa:ReplyTo>
<wsa:From>
<wsa:Address>http://146.184.16.48:5358</wsa:Address>
</wsa:From>
    </soap:Header>
    <soap:Body>
        <sca:GetScannerElementsRequest>
            <sca:RequestedElements>
                <cijn:IJCommand>
                    <cijn:IJCmdRecvImage>Image</cijn:IJCmdRecvImage>
                    <cijn:IJCmdRecvSize>1048592</cijn:IJCmdRecvSize>
                    <cijn:OSVersion>
                        <cijn:OSMajor>6</cijn:OSMajor>
                        <cijn:OSMinor>1</cijn:OSMinor>
                        <cijn:Build>6001</cijn:Build>
                        <cijn:SPMajor>1</cijn:SPMajor>
                        <cijn:SPMinor>0</cijn:SPMinor>
                        <cijn:Arch>9</cijn:Arch>
                    </cijn:OSVersion>
                </cijn:IJCommand>
            </sca:RequestedElements>
        </sca:GetScannerElementsRequest>
    </soap:Body>
</soap:Envelope>
```

FIG. 15

DELIVERY OF SCAN SERVICES OVER A DEVICE SERVICE PORT

FIELD

The present disclosure relates to delivery of scan services, and more particularly relates to delivery of scan services of a networked scanning device over a device service port.

BACKGROUND

Local scanning device clients typically communicate with local scanning devices via one of a number of different local device interfaces that allow the client's scanner driver to send device commands to the scanning device, one command at a time. Typical local device interfaces include USB interfaces, SCSI interfaces, parallel port interfaces, and the like. The client's driver typically sends scanning device commands to the scanning device to configure the scanning device before issuing a scan job, to issue the scan job, to retrieve an entire scan image, and to retrieve one band of scan image data at a time. Scanning device configuration includes setting scanning device lamp settings, getting scanning device lamp status, calibrating the scanning device, setting an image gamma curve at the scanning device, and the like. Some of these configuration actions involve sending a large block of binary data to the scanning device to effect configuration of the scanning device.

Networked scanning device clients often communicate with networked scanning devices via a device service protocol. One such device service protocol is the Microsoft® Web Services on Devices (WSD) architecture. The WSD architecture allows networked clients to discover and access a networked scanning device and its associated services across the network. The WSD architecture for Scan Services is described in "Scan Service Definition Version 1.0 For Web Services on Devices", Nov. 9, 2006, Microsoft Corporation, the contents of which are hereby incorporated by reference as if fully stated herein.

Such a device service protocol further provides for device discovery, description, control, and eventing. For example, the WSD architecture supports device discovery, description, control, and eventing, through the use of the Web Services on Devices Application Programming Interface (WSDAPI). The WSDAPI references a WSD XML schema which defines baseline functions exposed by a networked scanning device via a WSD port. The WSD XML schema also defines baseline parameters for the baseline functions. The client instructs the networked scanning device to execute a WSD function by sending the scanning device a request via the WSD port.

Baseline WSD functions include a GetScannerElement function, a CreateScanJob function, and a RetrieveImage function. The GetScannerElement function returns certain properties of the scanning device. Typical properties include Scanner Description, Scanner Configuration, Scanner Status, and the default Scan Properties. CreateScanJob creates a scan job that is performed by the networked scanning device. In response to receiving a request to execute the CreateScanJob function from the client, the networked scanning device performs the scan job to generate a scan image. RetrieveImage sends the entire scan image from the networked scanning device to the client in a data stream in a block of binary data.

SUMMARY

Although device service protocols allow a networked scanning device to deliver scan services to a networked client over a device service port, the device service protocols do not ordinarily allow a networked client to send device commands to a networked scanning device over the network. Therefore, scan services of the networked scanning device that are provided by device commands cannot ordinarily be delivered to the networked client over the device service port.

For example, a networked client cannot ordinarily send a large block of binary data to the networked scanning device over the device service port to effect configuration of the scanning device. Additionally, a networked client cannot ordinarily retrieve one band of image data at a time from the networked scanning device over the device service port.

Moreover, because device service protocols do not ordinarily allow a client to send device commands to a scanning device over the network, there is a difficulty in developing a universal client driver that can issue device commands to both local scanning devices, and networked scanning devices over a device service port.

The foregoing situation is addressed through the provision of an extended device service protocol XML schema that defines an additional parameter that specifies a device command of the scanning device, such that requests transmitted over the device service port can specify a device command to be executed by the scanning device.

Thus, in an example embodiment described herein, delivery of scan services of a networked scanning device over a device service port interfaced to the network is provided. An extended XML schema is referenced which defines plural functions exposed by the scanning device via the device service port. The extended XML schema further defines parameters for such functions. The extended XML schema is comprised of an extension to a baseline XML schema which defines baseline ones of plural functions exposed by the scanning device via the device service port together with baseline parameters for such baseline functions. The extension defines an additional parameter for a predesignated one of the plural baseline functions. A scan job is created by transmission of a request to create a scan job over the device service port. The request to create a scan job is transmitted from a client to the scanning device. A request for scanner functionality defined by the predesignated function is transmitted, from the client to the scanning device, via the device service port. The request for scanner functionality includes a non-null value for the additional parameter. The additional parameter specifies a device command of the scanning device. Data responsive to execution of the device command by the scanning device is transmitted from the scanning device to the client via the device service port.

In one advantage, a client can send device commands to a networked scanning device via a device service port.

In an example embodiment, the predesignated function comprises a function for requesting properties of the scanner device. In an example embodiment, the device service port is a Microsoft® Web Services on Devices (WSD) port and the predesignated function comprises a GetScannerElements function.

In an example embodiment, the client transmits a request for data to the scanning device via the device service port, the request for data is defined by one of the plural functions, and the scanning device transmits the data in response to receiving the request for data from the client. The request for data is defined by the predesignated function, and the request for data includes a non-null value for the additional parameter. The additional parameter specifies a request to receive data responsive to execution of the device command by the scanning device. In an example embodiment, the data received from the scanner device is short data.

In an example embodiment, the device command of the request for scanner functionality specifies retrieval of large block data, the data received from the scanner device is large block data, and retrieval of the large block data is effected through an asynchronous image data retrieval mechanism defined by the baseline XML schema. In an example embodiment, the device service port is a Microsoft® Web Services on Devices (WSD) port and the request for data is defined by a RetrieveImage function of the baseline XML schema.

In one advantage, by virtue of specifying retrieval of large block data, the client can control the scanning device to scan one band at a time via the device service port.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 6 depicts an example request to create a scan job according to an example embodiment.

FIG. 7 depicts a portion of the extended XML schema according to an example embodiment.

FIG. 8 depicts an example request for scanner functionality according to an example embodiment.

FIG. 9 depicts a portion of the extended XML schema according to an example embodiment.

FIG. 10 depicts an example status response according to an example embodiment.

FIG. 11 depicts example request for data according to an example embodiment.

FIG. 12 depicts an example data response according to an example embodiment.

FIG. 13 depicts example request for data according to an example embodiment.

FIG. 15 depicts an example request for scanner functionality according to an example embodiment.

DETAILED DESCRIPTION

Figure 1:
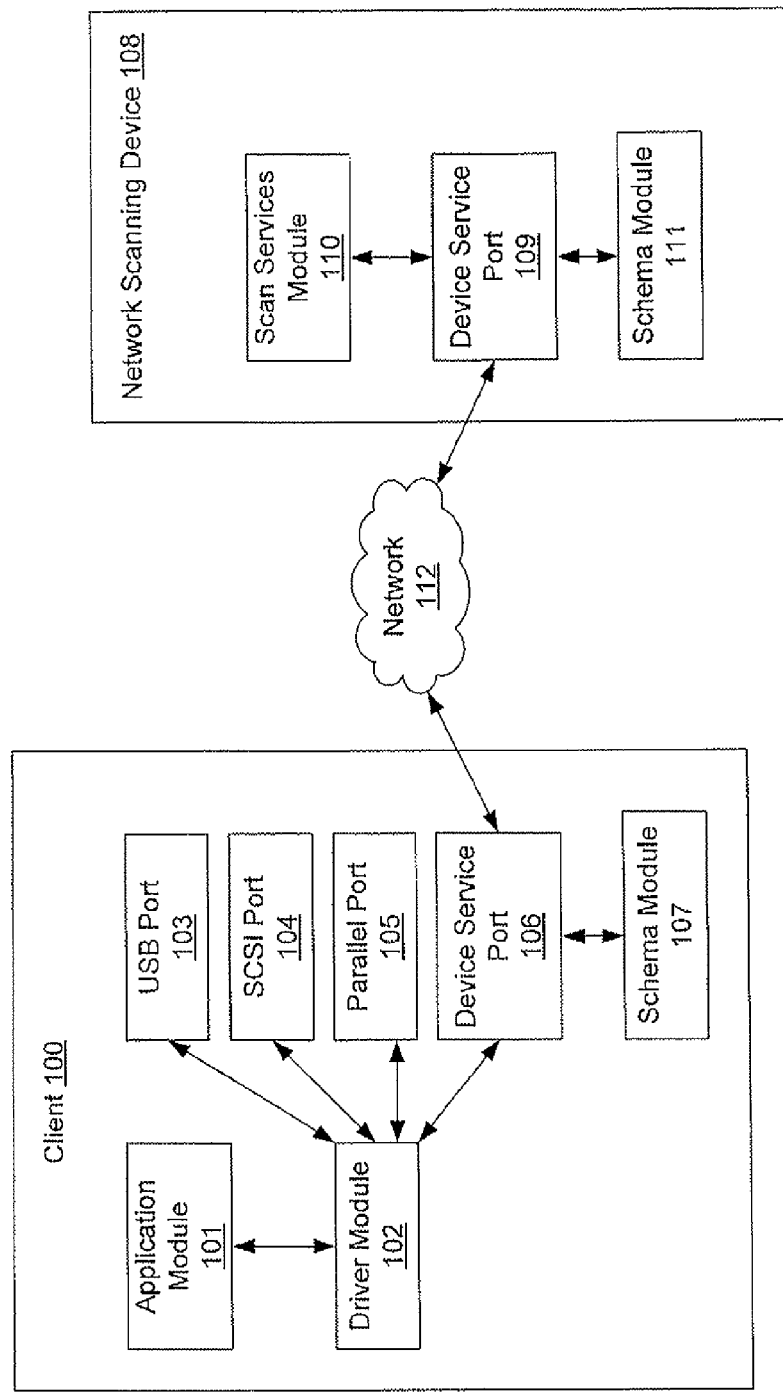
FIG. 1 is an architecture diagram for explaining delivery of scan services according to an example embodiment.

FIG. 1 is an architecture diagram for explaining delivery of scan services according to an example embodiment. As shown in FIG. 1, a networked scanning device client 100 is communicatively coupled with a networked scanning device 108 via a network 112. In the example embodiment, the network 112 is an Internet Protocol (IP) Network, such as, for example, the Internet, an intranet, and the like. In other example embodiments, the network can be any other suitable type of network.

The networked scanning device 108 includes a scan services module 110, a device service port 109, and a schema module 111. In the example embodiment, the scan services module 110 is stored as computer-executable process steps encoded in machine-executable instructions. The computer-executable process steps are for performing scan services. The computer-executable process steps of the scan services module 110 are stored in a storage device of the scanning device 108. The computer-executable process steps of scan services module 110 are executed by a processor of the scanning device 108.

In other embodiments, the scan services module 110 is a hardware device. The hardware device includes electronic circuitry constructed to perform scan services. In an example embodiment, the electronic circuitry includes special purpose processing circuitry that is constructed to provide scan services. In other example embodiments, the electronic circuitry includes at least one general purpose processor that is constructed to execute computer-executable process steps encoded in machine-executable instructions that are stored on a computer-readable storage medium of the hardware device. The computer-executable process steps executed by the general purpose processor include computer-executable process steps for providing scan services.

The scan services module 110 defines device commands of the scanning device 108. The device commands are executed by the scan services module 110 to perform scan services. In response to receiving an instruction to execute a device command, the scan services module 110 executes the device command, thereby performing a scan service. The scan services module 110 receives instructions to execute device commands, and transmits data responsive to execution of device commands, via the device service port 109. The device service port 109 provides network communication in accordance with a device service protocol.

In the example embodiment, the device service port 109 is a Web Services on Devices (WSD) port, and the device service protocol used by the device service port 109 is of Microsoft® Web Services on Devices (WSD) architecture. The WSD architecture allows networked clients to discover and access a networked scanning device and its associated services across the network. The WSD architecture for Scan Services is described in "Scan Service Definition Version 1.0 For Web Services on Devices", Nov. 9, 2006, Microsoft Corporation, the contents of which are hereby incorporated by reference as if fully stated herein. Such a device service protocol further provides for device discovery, description, control, and eventing. For example, the WSD architecture supports device discovery, description, control; and eventing, through the use of the Web Services on Devices Application Programming Interface (WSDAPI).

In the example embodiment, the device service port 109 is stored as computer-executable process steps encoded in machine-executable instructions. The computer-executable process steps are for providing network communication in accordance with a device service protocol. The computer-executable process steps of the device service port 109 are stored in a storage device of the scanning device 108. The computer-executable process steps of the device service port 109 are executed by a processor of the scanning device 108.

In other embodiments, the device service port 109 is a hardware device. The hardware device includes electronic circuitry constructed to perform network communication in accordance with a device service protocol. In an example embodiment, the electronic circuitry includes special purpose processing circuitry that is constructed to provide network communication in accordance with a device service protocol. In other example embodiments, the electronic circuitry includes at least one general purpose processor that is constructed to execute computer-executable process steps encoded in machine-executable instructions that are stored on a computer-readable storage medium of the hardware device. The computer-executable process steps executed by the general purpose processor include computer-executable process steps for providing network communication in accordance with a device service protocol.

In other example embodiments, the device service port 109 is included in the scan services module 110.

The schema module 111 accesses an extended XML schema which defines functions exposed by the networked scanning device 108 via the device service port 109, and which further defines parameters for such functions. A client instructs the networked scanning device 108 to execute a function by sending the scanning device 108 a request via the device service port 109.

In the example embodiment, the extended XML schema is stored on a remote device, such as, for example, a server device, and the schema module 111 accesses the extended XML schema stored on the remote device via a network, such as, for example, the network 112. However, in other embodiments, the extended XML schema can be stored on a computer-readable storage medium of the networked scanning device 108, and the schema module 111 accesses the extended XML schema stored on the computer-readable storage medium of the networked scanning device 108.

The extended XML schema is comprised of an extension to a baseline XML schema which defines baseline ones of plural functions exposed by the scanning device 108 via the device service port 109 together with baseline parameters for such baseline functions. The extension defines additional parameters for the plural baseline functions.

In the example embodiment, baseline functions include a baseline GetScannerElement, baseline CreateScanJob, and baseline RetrieveImage WSD functions. The baseline GetScannerElement function returns certain properties of the scanning device. Typical properties include Scanner Description, Scanner Configuration, Scanner Status, and the default Scan Properties. The baseline CreateScanJob function creates a scan job that is performed by the networked scanning device. In response to receiving a request to execute the baseline CreateScanJob function from the client, the networked scanning device performs the scan job to generate a scan image. The baseline RetrieveImage function sends the entire scan image from the networked scanning device to the client in a data stream in a block of binary data.

The extension defines additional parameters for plural baseline functions, as will be described below in more detail with respect to FIGS. 4, 5 and 14.

In the example embodiment, the schema module 111 is stored as computer-executable process steps encoded in machine-executable instructions. The computer-executable process steps are for providing access to the extended XML schema. The computer-executable process steps of the schema module 111 are stored in a storage device of the scanning device 108. The computer-executable process steps of the schema module 111 are executed by a processor of the scanning device 108.

In other embodiments, the schema module 111 is a hardware device. The hardware device includes electronic circuitry constructed to provide access to the extended XML schema. In an example embodiment, the electronic circuitry includes special purpose processing circuitry that is constructed to provide access to the extended XML schema. In other example embodiments, the electronic circuitry includes at least one general purpose processor that is constructed to execute computer-executable process steps encoded in machine-executable instructions that are stored on the computer-readable storage medium of the hardware device. The computer-executable process steps executed by the general purpose processor include computer-executable process steps for providing access to the extended XML schema.

In other example embodiments, the schema module 111 is included in the device service port 109.

The client 100 includes an application module 101, a driver module 102, a USB port 103, a SCSI port 104, a parallel port 105, a device service port 106, and a schema module 107.

The application module 101 uses the driver module 102 to access scan services of the network scanning device 108 over the network 112, via the device service port 106. In particular, the application module 101 sends scan instructions to the driver module for accessing scan services of the network scanning device 108. In response to receiving a scan instruction from the application module 101, the driver module 102 generates one or more instructions to execute corresponding device commands at the scanning device 108. In the example embodiment, each instruction generated by the driver module 102 instructs the scanning device 108 to execute a single device command. The driver module 102 sends each generated instruction to the network scanning device 108, one at a time, over the network 112 and via the device service port 106. The device service port 106 provides network communication in accordance with the device service protocol used by device service port 109.

As described above, in response to receiving an instruction to execute a device command, the scan services module 110 of scanning device 108 executes the device command. The scan services module 110 of scanning device 108 transmits data responsive to execution of device commands to the client 101 over the network 112 and via the device service port 109 of scanning device 1080

The device service port 106 is a Web Services on Devices (WSD) port, and the device service protocol used by the device service port 106 is of Microsoft® Web Services on Devices (WSD) architecture.

The schema module 107 accesses the extended XML schema that is accessed by schema module 110 of scanning device 108. As described above, the extended XML schema defines functions exposed by the networked scanning device 108 via the device service port 109, and further defines parameters for such functions. The device service port 106 of the client 100 uses the schema module 107 to reference the extended XML schema to access the functions exposed by the networked scanning device 108 via the device service port 109. The client 100 uses these functions defined by the extended XML schema to send, via the device service port 106, instructions to execute device commands to the networked scanning device 108.

In particular, the driver module 102 creates a scan job by transmission of a request to create a scan job to the scanning device 108 over the network 112 and via the device service port 106 of client 100. The driver 102 transmits to the scanning device 108, via the device service port 106, a request for scanner functionality defined by a predestinated function exposed by the networked scanning device 108. In the example embodiment, the predestinated function is the GetScannerElements function. The request for scanner functionality includes a non-null value for an additional parameter, defined in the extended XML schema, that specifies a device command of the scanning device 108. The scanning device 108 transmits to the client 101, via the device service port 109, data responsive to execution of the device command by the scanning device 108.

In the example embodiment, the application module 101, the driver module 102, the device service port 106, and the schema module 107 are stored as computer-executable process steps encoded in machine-executable instructions. The computer-executable process steps are stored in a storage device of the client 100. The computer-executable process steps are executed by a processor of the client 100.

In other embodiments, any one of the application module 101, the driver module 102, the device service port 106, and the schema module 107 can be a hardware device. Such a hardware device includes electronic circuitry constructed to perform a respective procedure. In an example embodiment, the electronic circuitry includes special purpose processing circuitry that is constructed to perform a respective procedure. In other example embodiments, the electronic circuitry includes at least one general purpose processor that is constructed to execute computer-executable process steps encoded in machine-executable instructions that are stored on a computer-readable storage medium of the hardware device. The computer-executable process steps executed by the general purpose processor include computer-executable process steps for performing a respective procedure.

In the example embodiment, the USB port 103, the SCSI port 104, and the parallel port 105, are hardware devices. Such a hardware device includes electronic circuitry constructed to communicate via a USB, SCSI, and parallel interface, respectively. In the example embodiment, the electronic circuitry includes special purpose processing circuitry that is constructed to perform a respective procedure. In other example embodiments, the electronic circuitry includes at least one general purpose processor that is constructed to execute computer-executable process steps encoded in machine-executable instructions that are stored on a computer-readable storage medium of the hardware device. The computer-executable process steps executed by the general purpose processor include computer-executable process steps for communicating via a respective interface.

In other example embodiments, the USB port 103, the SCSI port 104, and the parallel port 105, are stored as computer-executable process steps encoded in machine-executable instructions. The computer-executable process steps are stored in a storage device of the client 100. The computer-executable process steps are executed by a processor of the client 100.

Although the application module 101, the driver module 102, the USB port 103, the SCSI port 104, the parallel port 105, the device service port 106, and the schema module 107 are depicted as separate modules in FIG. 1, in other embodiments, any combination of the application module 101, the driver module 102, the USB port 103, the SCSI port 104, the parallel port 105, the device service port 106, and the schema module 107 can be included in one or more modules.

Figure 2:
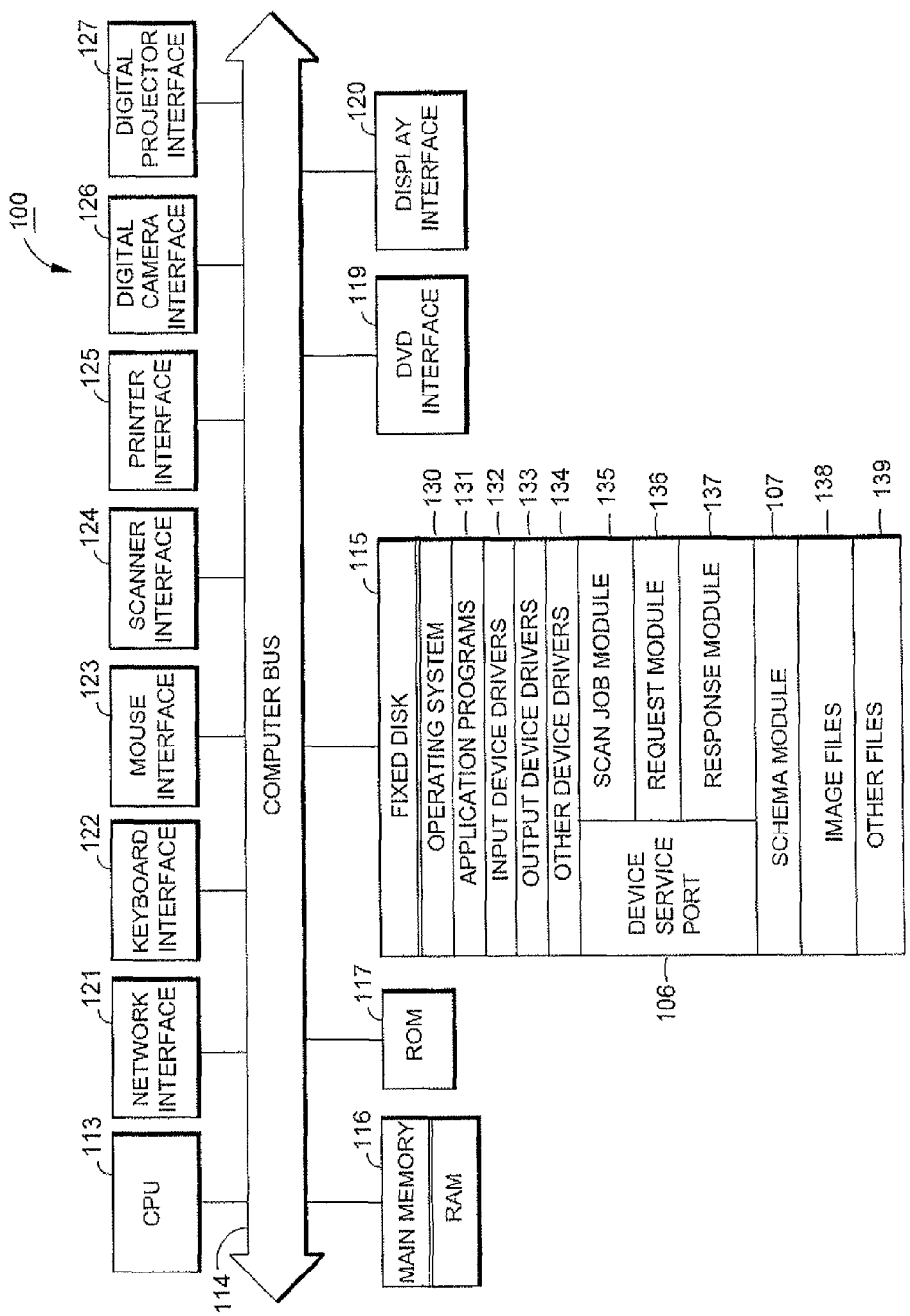
FIG. 2 is a detailed block diagram depicting the internal architecture of the client shown in FIG. 1.

FIG. 2 is a detailed block diagram showing the internal architecture of the client 100 of FIG. 1, As shown in FIG. 2, the client 100 includes a central processing unit (CPU) 113 which interfaces with a computer bus 114. Also interfacing with the computer bus 114 are a fixed disk 115, a network interface 121, a random access memory (RAM) 116 for use as a main run-time transient memory, a read only memory (ROM) 117, a DVD disk interface 119, a display interface 120 for a monitor, a keyboard interface 122 for a keyboard, a mouse interface 123 for a pointing device, a scanner interface 124 for a scanner, a printer interface 125 for a printer, a digital camera interface 126 for a digital camera, and a digital projector interface 127 for a digital projector.

The RAM 116 interfaces with the computer bus 114 so as to provide information stored in the RAM 116 to the CPU 113 during execution of the instructions in software programs such as an operating system, application programs, device service ports, and device drivers. More specifically, the CPU 113 first loads computer-executable process steps from the fixed disk 115, or another storage device into a region of the RAM 116. The CPU 113 can then execute the stored process steps from the RAM 116 in order to execute the loaded computer-executable process steps. Data such as images or other information can he stored in the RAM 116, so that the data can be accessed by the CPU 113 during the execution of computer-executable software programs, to the extent that such software programs have a need to access and/or modify the data.

As also shown in FIG. 2, the fixed disk 115 contains computer-executable process steps for an operating system 130, and application programs 131, such as word processing programs, graphic image management programs, and the application module 101 (of FIG. 1). The fixed disk 115 also contains computer-executable process steps for device drivers for software interface to devices, such as input device drivers 132, output device drivers 133, and other device drivers 134, such as, for example, the driver module 102 of FIG. 1. Image files 138 and other files 139 are available for output to output devices and for manipulation by application programs.

The device service port 106 is a module that comprises computer-executable process steps executed by a computer for accessing scan services of a networked scanning device over the device service ports 106 and 109, which are interfaced to the network 112 via the network interface 121. The device service port 106 generally comprises computer-executable process steps that use an extended device service protocol XML schema that defines an additional parameter that specifies a device command of the scanning device 108, such that requests transmitted over the device service port 106 can specify a device command to be executed by the scanning device 108. The device service port 106 includes a scan job module 135, and a request module 136, and a response module 137. The scan job module 135 includes computer-executable process steps for generating scan jobs. The request module 136 includes computer-executable process steps for generating and transmitting requests. The response module 137 includes computer-executable process steps for receiving and processing responses.

More specifically, the device service port 106 uses the schema module 107 to reference an extended XML schema which defines plural functions exposed by the scanning device 108 via the device service port 109, and which further defines parameters for such functions. The extended XML schema is comprised of an extension to a baseline XML schema which defines baseline ones of plural functions exposed by the scanning device 108 via the device service port 109 together with baseline parameters for such baseline functions. The extension defines an additional parameter for a predesignated one of the plural baseline functions. The scan job module 135 generates a scan job by transmission of a request to create a scan job over the client 100's device service port 106 and to the scanning device 108's device service port 109. The request module 136 transmits, from the client 100 to the scanning device 108, a request for scanner functionality defined by the predesignated function via the device service port 106. The request for scanner functionality includes a non-null value for the additional parameter, and the additional parameter specifies a device command of the scanning device 108. The response module 137 receives data responsive to execution of the device command by the scanning device 108, which is transmitted from the scanning device 108 to the client 101 via the device service port 109, The computer-executable process steps for device service port 106 may be configured as a part of the operating system 130, as part of an output device driver such as a scanner driver, or as a stand-alone application program. They may also be configured as a plug-in or dynamic link library (DLL) to the operating system, device driver or application program. For example, the device service port 106 according to example embodiments may be incorporated in an output device driver for execution in a computing device, such as a scanner driver, embedded in the firmware of an output device, such as a scanner, or provided in a stand-alone application for use on a general purpose computer. In one example embodiment described herein, the device service port 106 is incorporated directly into the operating system for client 100. It can be appreciated that the present disclosure is not limited to these embodiments and that the disclosed device service port 106 may be used in other environments in which scan services are used.

Figure 3:
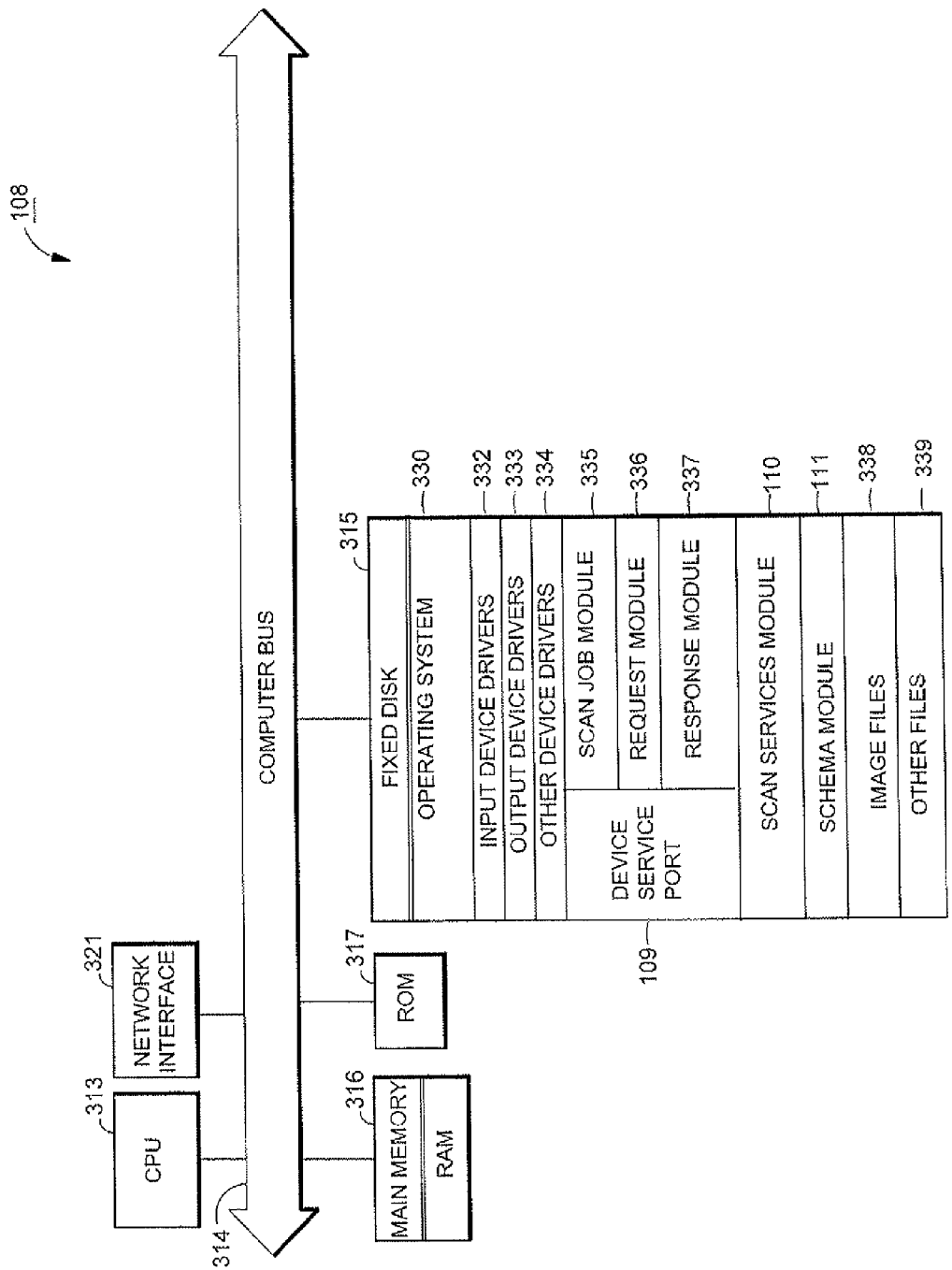
FIG. 3 is a detailed block diagram depicting the internal architecture of the scanning device shown in FIG. 1.

FIG. 3 is a detailed block diagram showing the internal architecture of the scanning device 108 of FIG. 1. As shown in FIG. 3, the scanning device 108 includes a central processing unit (CPU) 313 which interfaces with a computer bus 314. Also interfacing with the computer bus 314 are a fixed disk 315, a network interface 321, a random access memory (RAM) 316 for use as a main run-time transient memory, and a read only memory (ROM) 317.

The RAM 316 interfaces with the computer bus 314 so as to provide information stored in the RAM 316 to the CPU 313 during execution of the instructions in software programs such as an operating system, and device drivers. More specifically, the CPU 313 first loads computer-executable process steps from the fixed disk 315, or another storage device into a region of the RAM 316. The CPU 313 can then execute the stored process steps from the RAM 316 in order to execute the loaded computer-executable process steps. Data such as color images or other information can be stored in the RAM 316, so that the data can be accessed by the CPU 313 during the execution of computer-executable software programs, to the extent that such software programs have a need to access and/or modify the data.

As also shown in FIG. 3, the fixed disk 315 contains computer-executable process steps for an operating system 330. The fixed disk 315 also contains computer-executable process steps for device drivers for software interface to devices, such as input device drivers 332, output device drivers 333, and other device drivers 334. Image files 338 and other files 339 are available for output to clients and for manipulation by application programs.

The scan services module 110 is a module that comprises computer-executable process steps for device commands of the scanning device 108. The device commands are executed by the scan services module 110 to perform scan services. In response to receiving an instruction to execute a device command, the scan services module 110 executes the device command, thereby performing a scan service. The scan services module 110 receives instructions to execute device commands, and transmits data responsive to execution of device commands, via the device service port 109. The device service port 109 provides network communication in accordance with a device service protocol.

The device service port 109 is a module that comprises computer-executable process steps executed by a computer for providing scan services of a networked scanning device over the device service ports 106 and 109, which are interfaced to the network 112 via the network interface 321. The device service port 109 generally comprises computer-executable process steps that use an extended device service protocol XML schema that defines an additional parameter that specifies a device command of the scanning device 108, such that requests received over the device service port 109 can specify a device command to be executed by the scanning device 108. The device service port 109 includes a scan job module 335, a request module 336, and a response module 337. The scan job module 335 includes computer-executable process steps for processing scan jobs. The request module 336 includes computer-executable process steps for processing requests. The response module 337 includes computer-executable process steps for generating and transmitting responses.

More specifically, the device service port 109 uses the schema module 111 to reference an extended XML schema which defines plural functions exposed by the scanning device 108 via device service port 109, and which further defines parameters for such functions. The extended XML schema is comprised of an extension to a baseline XML schema which defines baseline ones of plural functions exposed by the scanning device 108 via the device service port 109, together with baseline parameters for such baseline functions. The extension defines an additional parameter for a predesignated one of the plural baseline functions. The scan job module 335 processes a request to create a scan job received from the client 100 over the device service port 109. The request module 336 receives, from the client, a request for scanner functionality defined by the predesignated function via the device service port 109. The request for scanner functionality includes a non-null value for the additional parameter, and the additional parameter specifies a device command of the scanning device 108. The response module 337 transmits data responsive to execution of the device command by the scanning service module 110. The response module 337 transmits the response to the client 100 via the device service port 109, and to the client's device service port 106.

The computer-executable process steps for device service port 109 may be configured as a part of the operating system 330, or as part of an output device driver such as a scanner driver. They may also be configured as a plug-in or dynamic link library (DLL) to the operating system, device driver or an application program. For example, the device service port 109 according to example embodiments may be incorporated in an output device driver for execution in a computing device, such as a scanner driver, embedded in the firmware of an output device, such as a scanner, or provided in a stand-alone application for use on a general purpose computer. In one example embodiment described herein, the device service port 109 is incorporated directly into the firmware of the scanning device 108. It can be appreciated that the present disclosure is not limited to these embodiments and that the disclosed color management module may be used in other environments in which color management is used.

Figure 4:
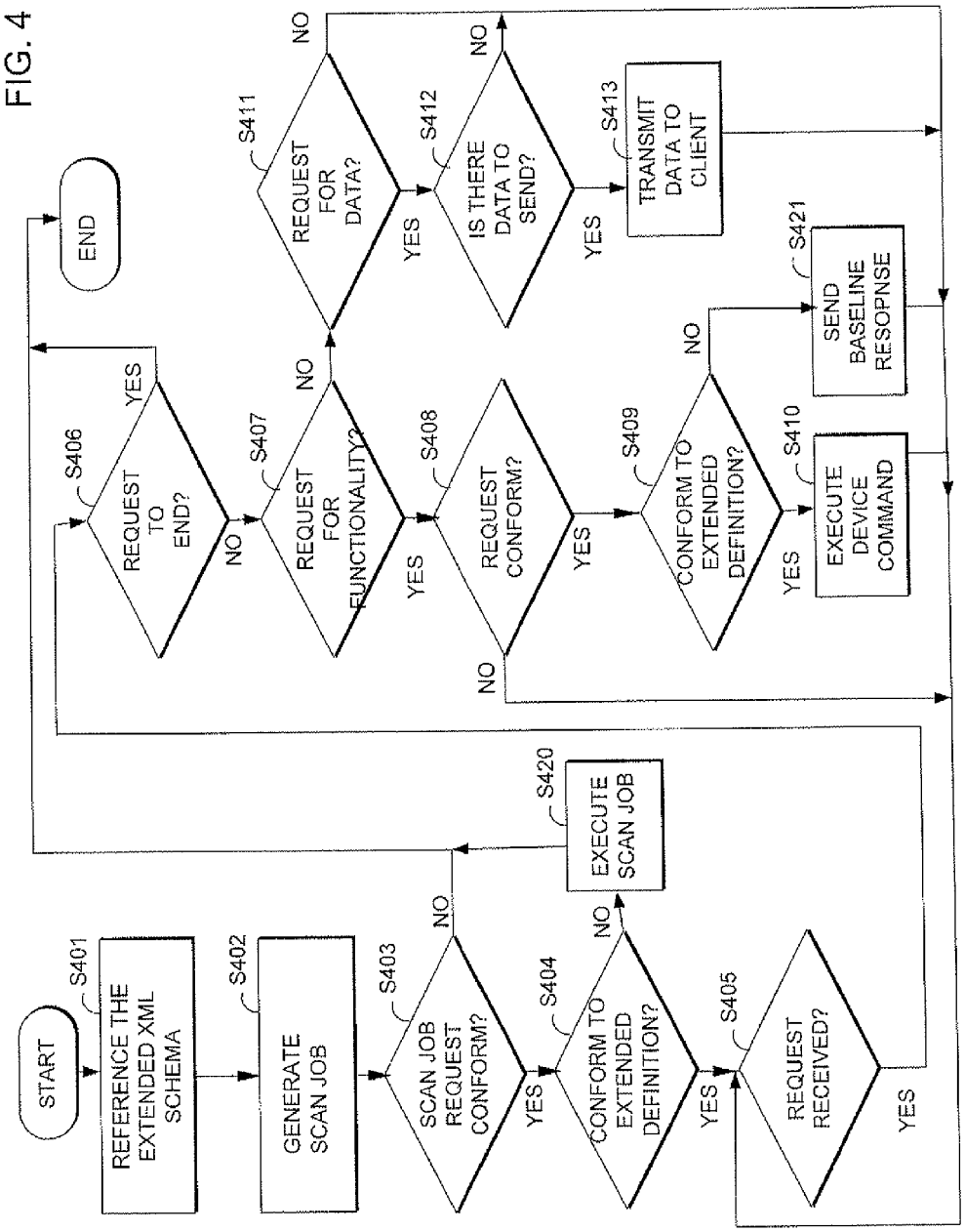
FIG. 4 is a flow diagram for explaining delivery of scan services according to an example embodiment.

FIG. 4 is a flow diagram for explaining delivery of scan services according to an example embodiment. The process steps shown in FIG. 4 are computer-executable process steps stored on a computer-readable memory medium such as at 106 on fixed disk 115 and at 109 on fixed disk 315, and are executed by CPU 113 of client 100 and CPU 313 of scanning device 108 (respectively), so as to deliver scan services of a networked scanning device over a device service port interfaced to a network.

Briefly, according to the process steps shown in FIG. 4, an extended XML schema is referenced which defines plural functions exposed by the scanning device via the device service port. The extended XML schema further defines parameters for such functions. The extended XML schema is comprised of an extension to a baseline XML schema which defines baseline ones of plural functions exposed by the scanning device via the device service port together with baseline parameters for such baseline functions. The extension defines an additional parameter for a predesignated one of the plural baseline functions. A scan job is created by transmission of a request to create a scan job over the device service port. The request to create a scan job is transmitted from a client to the scanning device. A request for scanner functionality defined by the predesignated function is transmitted, from the client to the scanning device, via the device service port. The request for scanner functionality includes a non-null value for the additional parameter. The additional parameter specifies a device command of the scanning device. Data responsive to execution of the device command by the scanning device is transmitted from the scanning device to the client via the device service port In more detail, in step S401, the device service port 106 of the client 100 uses the schema module 107 to reference an extended XML schema which defines plural functions exposed by the scanning device 108 via the device service port 109, and which further defines parameters for such functions. The extended XML schema is comprised of an extension to a baseline XML schema which defines baseline ones of plural functions exposed by the scanning device 108 via the device service port 109 together with baseline parameters for such baseline functions. The extension defines an additional parameter for a predesignated one of the plural baseline functions. In the example embodiment, the predesignated function is a function for requesting properties of the scanning device. In particular, the device service port is a Microsoft® Web Services on Devices (WSD) port, and the predesignated function is a GetScannerElements function.

In step S402, the scan job module 135 (FIG. 2) of the client 100 generates a scan job by generating a request to create a scan job in accordance with the extended XML schema referenced by the schema module 107. The scan job module 135 transmits the request to create a scan job over the client 100's device service port 106 and to the scanning device 108's device service port 109. In the example embodiment, the request to create a scan job includes an extended WSD CreateScanJob function. The extended CreateScanJob function defines an additional parameter that specifies information about the client 100. In the example embodiment, the client information specified by the additional parameter of the extended CreateScanJob function includes information about the driver 102 of the client 100 and the operating system 130 of the client 100. In other example embodiments, the additional parameter of the extended CreateScanJob function can include other information about the client 100.

At step S403, the scanning device 108 receives the request to create a scan job from the client 100. The scan job module 335 (of FIG. 3) of the scanning device 108 processes a request to create a scan job received from the client 100 over the device service port 109. In particular, the scan job module 335 uses the schema module 111 to reference the extended XML schema referenced by the schema module 107 of client 100, and determines whether the received request to create a scan job conforms to the extended XML schema. In a case where the scan job module 335 determines that the received request to create a scan job does not conform to the extended XML schema ("NO" at step S403), processing ends. In a case where the scan job module 335 determines that the received request to create a scan job conforms to the extended XML schema ("YES" at step S403), then at step S404, the scan job module 335 further determines whether the request to create a scan job conforms to a baseline definition of the request to create a scan job in the extended XML schema or to the extended definition of the request to create a scan job in the extended XML schema.

In a case where the scan job module 335 determines that the received request to create a scan job conforms to the baseline definition ("NO" at step S404), then at step S420 the scan job module 335 executes a scan job in accordance with parameters included in the received request to create a scan job, transmits the resulting scan data to the client 100 in response to receiving a request for data from the client 100, and thereafter, process ends.

In a case where the scan job module 335 determines that the received request to create a scan job conforms to the extended definition ("YES" at step S404), the scan job module 335 does not execute the a scan job. Instead of executing the scan job, in step S405, the request module 336 of the scanning device 108 waits to receive a request from the client 100.

In step S405, in a case where the request module 336 receives a request from the client 100 ("Yes" at step S405), the at step S406, request module 336 determines whether the request is a request to end the scan job. In a case where the request module 336 receives a request to end the scan job ("Yes" at step S406), the scan job module 335 ends the scan job, and processing ends. In a case where the request module 336 does not receive a request to end the scan job ("NO" at step S406), then at step S407, the request module 336 determines whether the request is a request for scanner functionality.

Such a request for scanner functionality is generated by the request module 136 of client 100, in accordance with the extended XML schema referenced by the schema module 107. The request for scanner functionality includes a function for requesting properties of the scanning device 108, and includes a parameter that specifies a device command of scanning device 108. In the example embodiment, the function for requesting properties of the scanning device 108 is an extended WSD GetScannerElements function. The extended GetScannerElements function defines an additional parameter that specifies a device command of scanning device 108.

In a case where the request module 336 determines that the request is a request for scanner functionality ("YES" at step S407), then at step S408, the request module 336 uses the schema module 111 to reference the extended XML schema referenced by the schema module 107 of client 100, and determines whether the received request for scanner functionality conforms to the extended XML schema.

In a case where the request module 336 determines that the received request for scanner functionality does not conform to the extended XML schema ("NO" at step S408), the request module 336 waits to receive another request from the client 100 at step S405.

In a case where the request module 336 determines that the received request for scanner functionality conforms to the extended XML schema ("YES" at step S408), then at step S409 the request module 336 further determines whether the request for scanner functionality conforms to a baseline definition of the request for scanner functionality in the extended XML schema or to the extended definition of the request for scanner functionality in the extended XML schema.

In a ease where the request module 336 determines that the received request for scanner functionality conforms to the baseline definition ("NO" at step S409), then at step S421 scanning device 108 generates and sends a response in accordance with the baseline request for scantier functionality, and the scanning device 108 waits to receive another request from the client 100 at step S405.

In a case where the request module 336 determines that the received request for scanner functionality conforms to the extended definition ("YES" at step S409), processing proceeds to step S410. In step S410, the scan services module 110 executes the device command specified in the received request for scanner functionality to generate data, sends a status response to the client 100, and the scanning device 108 waits to receive another request from the client 100 at step S405. In the example embodiment, the status response indicates whether the device command was successfully executed, but in other embodiments, the status response can indicate any other type of status.

In a case where the request module 336 determines that the request is not a request for scanner functionality ("NO" at step S407), then at step S411 the request module 336 determines whether the request is a request for data. The request for data includes a function defined in the extended XML schema.

In a case where the request module 336 determines that the request is not a request for data ("NO" at step S411), the request module 336 waits to receive another request from the client 100 at step S405.

In a case where the request module 336 determines that the request is a request for data ("YES" at step S411), then at step S412, the response module 337 determines whether there is any data to be sent to the client 100. In a case where the response module 337 determines that there is no data to send to the client 100 ("NO" at step S412), the response module 336 sends a status response to the client 100, and the scanning device 108 waits to receive another request from the client 100 at step S405. In the example embodiment, the status response indicates that there is no data to be sent to the client. In a case where the response module 337 determines that there is data to send to the client 100 ("YES" at step S412), then at step S413, the response module 337 of the scanning device 108 transmits the data to the client 100, and then the scanning device 108 waits to receive another request from the client 100 at step S405.

In the example embodiment, the scanning device 108 has a device command for generating large block data, such as, for example, a block of image data. In a case where the device command specified in the request received at step S405 is a device command for generating large block data, the data received from the scanning device at step S413 is large block data. In this case, the retrieval of the large block data is effected through an asynchronous image data retrieval mechanism defined by the baseline XML schema. In the example embodiment, in the case where the device command specified in the request received at step S405 is a device command for generating large block data, the request for data received by the request module 336 specifies the baseline WSD RetrieveImage function.

In a case where the device command specified in the request received at step S405 is not a device command for generating large block data, the request for data is defined by an extended definition of predesignated function, and the data received from the scanning device is short data. The extended definition of the predesignated function specifies a non-null value for an additional parameter that specifies a request to receive data. In the example embodiment, the predesignated function is the extended GetScannerElements function.

Figure 5:
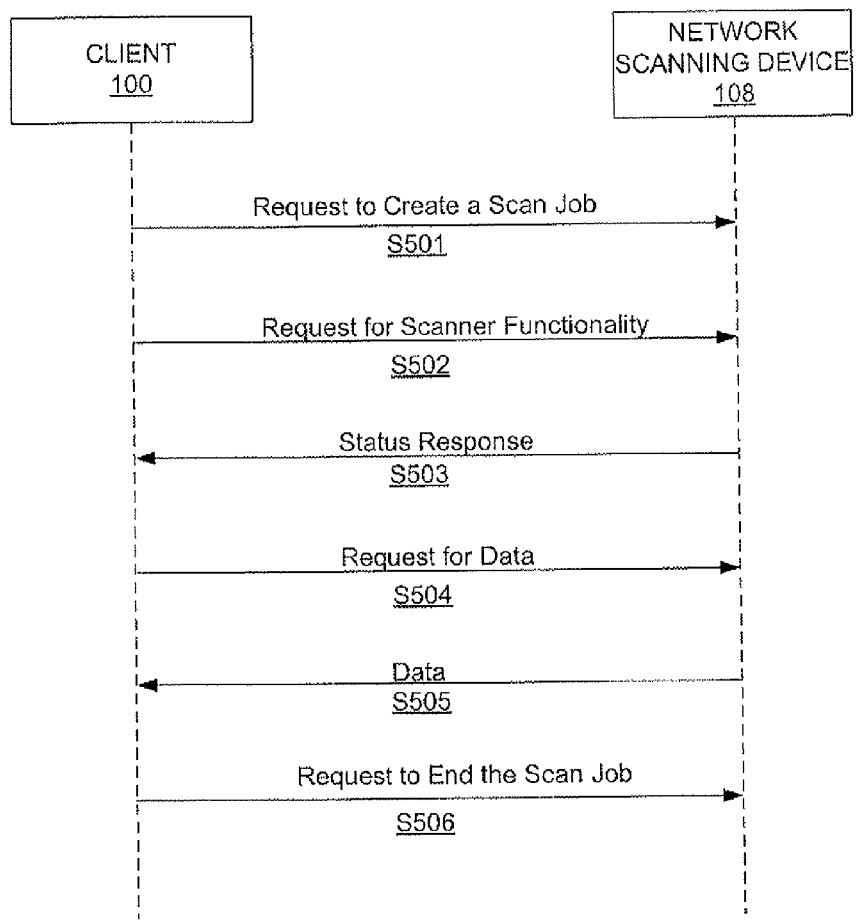
FIG. 5 is a sequence diagram for explaining delivery of scan services according to an example embodiment.
Figure 14:
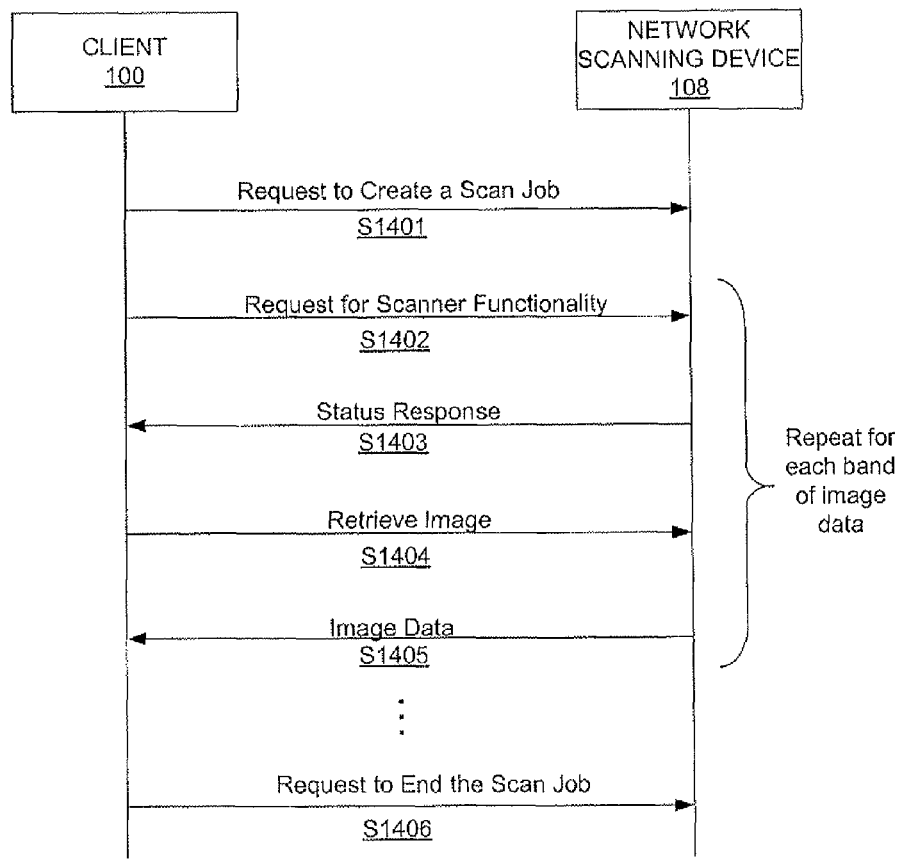
FIG. 14 is a sequence diagram for explaining delivery of scan services according to an example embodiment.

A procedure for delivery of scan services in which short data is retrieved is described with respect to FIG. 5, and a procedure for delivery of scan services in which large block data is retrieved is described with respect to FIG. 14.

FIG. 5 is a sequence diagram for explaining delivery of scan services in which short data is retrieved. In the example embodiment, as shown FIG. 5, at step S501 the scan job module 135 (FIG. 2) of the client 100 generates a scan job by generating a request to create a scan job in accordance with the extended XML schema referenced by the schema module 107. The scan job module 135 transmits the request to create a scan job over the client 100's device service port 106 and to the scanning device 108's device service port 109. As described above, in the example embodiment, the request to create a scan job includes an extended WSD CreateScanJob function. The extended CreateScanJob function defines an additional parameter that specifies information about the client 100. In the example embodiment, the client information specified by the additional parameter of the extended CreateScanJob function includes information about the driver 102 of the client 100 and the operating system 130 of the client 100.

An example request to create a scan job is shown in FIG. 6. As shown in FIG. 6, the request to create a scan job specifies an extended WSD CreateScanJob function. The specified CreateScanJob function is identified as an extended CreateScanJob function by the additional parameters specified in the <sca:CreateScanJobReqest> element of the request to create a scan job, as identified by the <cijsn:IJCommand> element. The <cijsn:IJCommand> element is defined in the extended XML schema. In the example embodiment, the extended XML schema is an extended version of the WS-Scan schema, the contents of which are hereby incorporated by reference as if fully stated herein. In particular, the WS-Scan schema is extended to include an additional parameter for the WS-Scan <sca:CreateScanJobRequest> element. This is done by adding an <xs:any> element to the definition of the <sca:CreateScanJobRequest> element 701 of FIG. 7, which depicts a portion of the extended XML schema. The namespace attribute of the <xs:any> element is set to "##other" so that a custom namespace can be used for the <xs:any> element. The minOccurs attribute of the <xs:any> element is set to "0" to define the <xs:any> element as an optional element, thereby providing for compatibility with the baseline WS-Scan specification. The <cijsn:IJCommand> element is linked to the <xs:any> element.

At step S502, the client 100 sends the scanning device 108 a request for scanner functionality. The request for scanner functionality includes a function for requesting properties of the scanning device 108, and includes a parameter that specifies a device command of scanning device 108. As described above, in the example embodiment, the function for requesting properties of the scanning device 108 is an extended WSD GetScannerElements function. The extended GetScannerElements function defines an additional parameter that specifies a device command of scanning device 108.

An example request for scanner functionality is shown in FIG. 8. As shown in FIG. 8, the request for scanner functionality specifies an extended WSD GetScannerElements function. The specified GetScannerElements function is identified as an extended GetScannerElements function by the additional parameters specified in the <sca:RequestedElements> element of the request for scanner functionality, as identified by the <cijsn:IJCommand> element. The <cijsn:IJCommand> element is defined in the extended XML schema. As described above, in the example embodiment, the extended XML schema is an extended version of the WS-Scan schema. In particular, the WS-Scan schema is extended to include an additional parameter for the WS-Scan <sca:RequestedElements> element. This is done by adding an <xs:any> element to the definition of the <sca:RequestedElements> element 901 of FIG. 9, which depicts a portion of the extended XML schema. The namespace attribute of the <xs:any> element is set to "##other" so that a custom namespace can be used for the <xs:any> element. The minOccurs attribute of the <xs:any> element is set to "0" to define the <xs:any> element as an optional element, thereby providing for compatibility with the baseline WS-Scan specification. The <cijsn:IJCommand> element is linked to the <xs:any> element of the <sca:RequestedElements> element. As shown in FIG. 9, the <cijsn:IJCommand> element specifies a device command using the <cijsn:IJCmdSend> element. In the example embodiment, the device commands of scanning device 108 are in a binary format. The binary device command in the request for scanner functionality is encoded as hex data in a text string. The device command and any corresponding parameters are encoded into a string, without any delimiters, using the hex formatting. Since exactly two characters are used to represent each byte, the scanning device 108 can determine the number of bytes in the block of data that represents the device command based on the number of characters in the string representing the device command. The <cijsn:IJCommand> also specifies the version of the operating system of client 100.

The <scaRequestedElements> element of the request to for scanner functionality can include baseline parameters in addition to the additional parameter <cijsn:IJCommand>.

At step S503, the scan services module 110 of the scanning device 108 executes the device command specified in the received request for scanner functionality to generate data, and sends a status response to the client 100. In the example embodiment, the status response indicates whether the device command was successfully executed, but in other embodiments, the status response can indicate any other type of status.

An example status response to the request for scanner functionality is shown in FIG. 10. As shown in FIG. 10, the status response specifies the additional parameter <cijsn:IJCommand>. The <cijsn:IJCommand> element of the status response specifies whether the device command was successfully executed, specifies information about the driver 102 of the client 100 and specifies information about the operating system 130 of the client 100.

At step S504, the client 100 sends a request for data to scanning device 108. The request for data includes a function for requesting properties of the scanning device 108, and includes a parameter that specifies a device command of scanning device 108. As described above, in the example embodiment, the function for requesting properties of the scanning device 108 is an extended WSD GetScannerElements function. The extended GetScannerElements function defines an additional parameter that specifies a device command of scanning device 108. The device command specified in the request for data is a request to receive data responsive to execution a previously executed device command.

In the example embodiment, the requested data corresponds to the execution of the device command specified in step S502. In the example embodiment, in a case where more than one device command is executed before the client 100 requests data from the scanning device 108, the generated data is returned to the client 100 in the order in which it is generated. In other words, data for a first executed device command is returned before data for a subsequently executed device commands In other example embodiments, data for a specific device command can be requested. In other embodiments, data for a most recently executed device command is returned before data for previously executed device commands. In other embodiments, data for a most recently executed device command is returned, and data for device commands executed before the most recently executed device command is not returned. In other embodiments, in response to a request for data, data is returned for a first device command executed after either a most recent request for data or after a request to create a scan job, and data for device commands executed after the first device command and before the request for data is not returned.

An example request for data is shown in FIG. 11. As shown in FIG. 11, the request for scanner functionality specifies an extended WSD GetScannerElements function. The specified GetScannerElements function is identified as an extended GetScannerElements function by the additional parameters specified in the <sca:RequestedElements> element of the request for scanner functinoality, as identified by the <cijsn:IJCommand> element. As described above, the <cijsn:IJCommand> element is defined in the extended XML schema. As shown in FIG. 11, the <cijsn:IJCommand> element of the request for data specifies a device command using the <cijsn:IJCmdRecvShort> element and the <cijsn:IJCmdRecvSize> element. The <cijsn:IJCmdRecvShort> element represents a device command for receiving a specified number of bytes of data and the <cijsn:IJCmdRecvSize> element represents a parameter indicating the number of bytes of data to receive. In other example embodiments, the <cijsn:IJCommand> element of the request for data specifies a device command using the <cijsn:IJCmdRecvShort> element and does note specify a parameter indicating the number of bytes of data to receive. The <cijsn:IJCommand> element also includes information about the operating system 130 of the client 100.

At step S505, the response module 337 of the scanning device 108 transmits the requested data to the client 100 in a data response. In the example embodiment, the data transmitted to the client 100 in response to receiving the request for data having the <cijsn:IJCmdRecvShort> element is short data. Short data includes, for example, status messages, or any other type of data other than image data.

An example data response to the request for data is shown in FIG. 12. As shown in FIG. 12, the data response specifies the additional parameter <cijsn:IJCommand>. The <cijsn:IJCommand> element of the status response includes the requested data, specifies information about the driver 102 of the client 100 and specifies information about the operating system 130 of the client 100. The returned data is identified by the <cijsn:IJCmdRecvShort> element of the data response. In the example embodiment, the data in the data response is encoded as a string, without any delimiters, using the hex format in which two characters represent each byte.

At step S506, and after all requested device commands for the current scan job have been executed, the client 100 sends a request to end the scan job. The request to end the scan job includes a function for requesting properties of the scanning device 108, and includes a parameter that specifies a device command of scanning device 108. As described above, in the example embodiment, the function for requesting properties of the scanning device 108 is an extended WSD GetScannerElements function. The extended GetScannerElements function defines a "close port" message to request the scanning device 108 to end the current scan job.

An example request for data is shown in FIG. 13. As shown in FIG. 13, the request to end the scan job specifies an extended WSD GetScannerElements function. The specified GetScannerElements function is identified as an extended GetScannerElements function by values of the <sca:Name> elements of the <sca:RequestedElements> element. As shown in FIG. 13, the <sea:Name> elements of the <sca:RequestedElements> element specify the values "cijsn:IJCommand" and "cijsn:IJCmdPhase-Close", to instruct the scanning device 108 to end the current scan job.

FIG. 14 is a sequence diagram for explaining delivery of scan services in which large block data is retrieved. In the example embodiment, as shown FIG. 14, at step S1401 the scan job module 135 (FIG. 2) of the client 100 generates a scan job as described above with respect to step S501 of FIG. 5.

At step S1402, the client 100 sends the scanning device 108 a request for scanner functionality. The request for scanner functionality includes a function for requesting properties of the scanning device 108, and includes a parameter that specifies a device command of scanning device 108. As described above, in the example embodiment, the function for requesting properties of the scanning device 108 is an extended WSD GetScannerElements function. The extended GetScannerElements function defines an additional parameter that specifies a device command of scanning device 108.

An example request for scanner functionality is shown in FIG. 15. As shown in FIG. 15, the request for scanner functionality specifies an extended WSD GetScannerElements function. The specified GetScannerElements function is identified as an extended GetScannerElements function by the additional parameters specified in the <sca:RequestedElements> element of the request for scanner functionality, as identified by the <cijsn:IJCommand> element. The <cijsn:IJCommand> element is defined in the extended XML schema. As shown in FIG. 15, the <cijsn:IJCommand> element specifies a device command using the <cijsn:IJCmdRecvImage> element and the <cijsn:IJCmdRecvSize> element. The <cijsn:IJCmdRecvImage> element specifies the "image" value to request execution of a device command for scanning a band of image, and the value of the <cijsn:IJCmdRecvSize> element is a string encoded with the number of bytes to be read. The <cijsn:IJCommand> also specifies the version of the client 100's operating system.

At step S1403, the scan services module 110 of the scanning device 108 executes the device command specified in the received request for scanner functionality to generate data for a band of image, and sends a status response to the client 100. In the example embodiment, the status response indicates whether the device command was successfully executed, but in other embodiments, the status response can indicate any other type of status.

At step S1404, the client 100 retrieves the large block data through an asynchronous image data retrieval mechanism defined by the baseline XML schema. In particular, at step S1404, the client 100 sends a request for data to scanning device 108. The request for data includes a baseline function for retrieving an image. In the example embodiment, the baseline function for retrieving an image is a baseline WSD RetrieveImage function.

At step S1405, the response module 337 of the scanning device 108 transmits the requested image data to the client 100. In the example embodiment, the scanning device 108 transmits the requested image data to the client 100 in a stream. In the example embodiment, the stream is a Message Transmission Optimization Mechanism (MTOM) stream.

Steps S1402 to 1405 are repeated to scan each subsequent band of image and to transmit the corresponding image data to the client 100, until all image data is transmitted to the client 100.

At step S1406, and after all requested device commands for the current scan job have been executed, the client 100 sends a request to end the scan job, as described above with respect to step S506 of FIG. 5.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for delivery of scan services of a networked scanning device over a device service port interfaced to a client, the method comprising:
 receiving a request to create a scan job over the device service port from the client;
 determining whether the received request conforms or does not conform to an extended XML schema, wherein the extended XML schema is comprised of an extension to a baseline XML schema which defines baseline functions exposed by the scanning device;
 determining, if it is determined that the received request conforms to the extended XML schema, whether the request conforms to a baseline definition or to an extended definition;
 executing, if the received request conforms to the baseline definition, a process in accordance with parameters included in the received request;
 waiting, if the received request conforms to the extended definition, for a next request; and
 executing, if the next request is received, a device command specified in the next request.

2. The method according to claim 1, wherein the device service port is a Web Services on Devices (WSD) port.

3. The method according to claim 1, wherein the client transmits a request for data to the scanning device via the device service port, wherein the request for data is defined by one of the plural functions, and wherein the scanning device transmits the data in response to receiving the request for data from the client.

4. The method according to claim 3, wherein the request for data includes a non-null value for the additional parameter, and wherein the additional parameter specifies a request to receive data responsive to execution of the device command by the scanning device.

5. The method according to claim 3, wherein the command of the request for scanner functionality specifies retrieval of large block data, wherein the data received from the scanning device is large block data, and wherein retrieval of the large block data is effected through an asynchronous image data retrieval mechanism defined by the baseline XML schema.

6. The method according to claim 5, wherein the device service port is a Web Services on Devices (WSD) port, and the request for data is defined by a RetrieveImage function of the baseline XML schema.

7. A network scanning device module for delivery of scan services of a networked scanning device over a device service port interfaced to the network, the scanning device module comprising:
 a schema module constructed to reference an extended XML schema, wherein the extended XML schema is comprised of an extension to a baseline XML schema which defines baseline functions exposed by the scanning device;
 a module constructed to receive a request to create a scan job over the device service port from the client;
 a module constructed to determine whether the received request conforms or does not conform to the extended XML schema;
 a module constructing to determine, if the received request conforms to the extended XML schema, whether the received request conforms to a baseline definition or to an extended definition;
 a module constructed to execute, if the received request conforms to the baseline definition, a process in accordance with parameters included in the received request;

a module constructed to wait, if the received request conforms to the extended definition, for a next request; and a module constructed to execute, if the next request is received, a device command specified in the next request.

8. The network scanning device module according to claim 7, wherein the device service port is a Web Services on Devices (WSD) port.

9. The network scanning device module according to claim 7, wherein the client transmits a request for data to the scanning device via the device service port, wherein the request for data is defined by one of the plural functions, and wherein the scanning device transmits the data in response to receiving the request for data from the client.

10. The network scanning device module according to claim 9, wherein the request for data includes a non-null value for the additional parameter, and wherein the additional parameter specifies a request to receive data responsive to execution of the device command by the scanning device.

11. The network scanning device module according to claim 9, wherein the command of the request for scanner functionality specifies retrieval of large block data, wherein the data received from the scanning device is large block data, and wherein retrieval of the large block data is effected through an asynchronous image data retrieval mechanism defined by the baseline XML schema.

12. The network scanning device module according to claim 11, wherein the device service port is a Web Services on Devices (WSD) port, and the request for data is defined by a RetrieveImage function of the baseline XML schema.

13. A networked scanning device, the networked scanning device comprising:

a computer-readable memory constructed to store computer-executable process steps; and a processor constructed to execute the computer-executable process steps stored in the memory;

wherein the process steps stored in the memory cause the processor to perform a method for delivery of scan services of the networked scanning device over a device service port interfaced to a client and include computer-executable process steps to:

receive a request to create a scan job over the device service port from the client;

determine whether the received request conforms or does not conform to an extended XML schema, wherein the extended XML schema is comprised of an extension to a baseline XML schema which defines baseline functions exposed by the scanning device;

determine, if it is determined that the received request conforms to the extended XML schema, whether the request conforms to a baseline definition or to an extended definition;

execute, if the received request conforms to the baseline definition, a process in accordance with parameters included in the received request;

wait, if the received request conforms to the extended definition, for a next request; and execute, if the next request is received, a device command specified in the next request.

14. The networked scanning device according to claim 13, wherein the device service port is a Web Services on Devices (WSD) port.

15. The networked scanning device according to claim 13, wherein the client transmits a request for data to the scanning device via the device service port, wherein the request for data is defined by one of the plural functions, and wherein the scanning device transmits the data in response to receiving the request for data from the client.

16. The networked scanning device according to claim 15, wherein the request for data includes a non-null value for the additional parameter, and wherein the additional parameter specifies a request to receive data responsive to execution of the device command by the scanning device.

17. The networked scanning device according to claim 15, wherein the command of the request for scanner functionality specifies retrieval of large block data, wherein the data received from the scanning device is large block data, and wherein retrieval of the large block data is effected through an asynchronous image data retrieval mechanism defined by the baseline XML schema.

18. The networked scanning device according to claim 17, wherein the device service port is a Web Services on Devices (WSD) port, and the request for data is defined by a RetrieveImage function of the baseline XML schema.

19. A non-transitory computer-readable memory medium on which is stored computer-executable process steps for causing a network scanning device to perform a method for delivery of scan services of the networked scanning device over a device service port interfaced to a client, wherein the process steps comprise:

receiving a request to create a scan job over the device service port from the client;

determining whether the received request conforms or does not conform to an extended XML schema, wherein the extended XML schema is comprised of an extension to a baseline XML schema which defines baseline functions exposed by the scanning device;

determining, if it is determined that the received request conforms to the extended XML schema, whether the request conforms to a baseline definition or to an extended definition;

executing, if the received request conforms to the baseline definition, a process in accordance with parameters included in the received request;

waiting, if the received request conforms to the extended definition, for a next request; and executing, if the next request is received, a device command specified in the next request.

20. The computer-readable memory medium according to claim 19, wherein the device service port is a Web Services on Devices (WSD) port.

21. The computer-readable memory medium according to claim 19, wherein the client transmits a request for data to the scanning device via the device service port, wherein the request for data is defined by one of the plural functions, and wherein the scanning device transmits the data in response to receiving the request for data from the client.

22. The computer-readable memory medium according to claim 21, wherein the request for data includes a non-null value for the additional parameter, and wherein the additional parameter specifies a request to receive data responsive to execution of the device command by the scanning device.

23. The computer-readable memory medium according to claim 21, wherein the command of the request for scanner functionality specifies retrieval of large block data, wherein the data received from the scanning device is large block data, and wherein retrieval of the large block data is effected through an asynchronous image data retrieval mechanism defined by the baseline XML schema.

24. The computer-readable memory medium according to claim 23, wherein the device service port is a Web Services on Devices (WSD) port, and the request for data is defined by a RetrieveImage function of the baseline XML schema.

* * * * *